United States Patent
Usui et al.

(10) Patent No.: US 7,510,195 B2
(45) Date of Patent: Mar. 31, 2009

(54) HIGH TEMPERATURE AND HIGH PRESSURE COMPRESSOR PISTON RING

(75) Inventors: Yoshio Usui, Torrance, CA (US); Tom Iles, Rancho Palos Verde, CA (US); Trung N. Tran, Torrance, CA (US)

(73) Assignee: Honeywell International Inc., Morristown, NJ (US)

( * ) Notice: Subject to any disclaimer, the term of this patent is extended or adjusted under 35 U.S.C. 154(b) by 1208 days.

(21) Appl. No.: 10/719,223

(22) Filed: Nov. 21, 2003

(65) Prior Publication Data

US 2005/0109289 A1    May 26, 2005

(51) Int. Cl.
*F16J 9/14*    (2006.01)
*F16J 9/26*    (2006.01)
*F02F 5/00*    (2006.01)

(52) U.S. Cl. .................. 277/435; 277/498; 277/465
(58) Field of Classification Search ................ 277/435, 277/465, 496–499
See application file for complete search history.

(56) References Cited

U.S. PATENT DOCUMENTS

| | | | | |
|---|---|---|---|---|
| 1,321,539 A * | 11/1919 | Mummert | .................... | 277/467 |
| 1,385,613 A * | 7/1921 | Gill | ............................ | 277/461 |
| 1,485,128 A * | 2/1924 | Small | .......................... | 277/469 |
| 1,565,299 A * | 12/1925 | Wenzel | .................. | 29/888.075 |
| 2,042,820 A * | 6/1936 | Bax | ............................ | 277/461 |
| 2,226,921 A * | 12/1940 | Hawker | ....................... | 277/465 |
| 2,569,777 A * | 10/1951 | Phillips | ...................... | 277/499 |
| 2,591,920 A * | 4/1952 | Colvin | ........................ | 277/434 |
| 2,844,422 A * | 7/1958 | Felix | ........................... | 277/436 |
| 3,795,430 A | 3/1974 | Farley | | |
| 4,147,538 A * | 4/1979 | Yajima et al. | .................. | 75/229 |
| 4,175,753 A | 11/1979 | Wentworth | | |
| 4,346,684 A * | 8/1982 | Vossieck | .................... | 123/188.8 |
| 4,348,232 A * | 9/1982 | Hiraoka et al. | ................. | 75/238 |
| 4,522,230 A | 6/1985 | Clapper et al. | | |
| 4,592,559 A * | 6/1986 | Harvey | ....................... | 277/461 |
| 4,681,326 A * | 7/1987 | Kubo | .......................... | 277/447 |
| 4,692,305 A * | 9/1987 | Rangaswamy et al. | ....... | 420/436 |
| 4,832,351 A | 5/1989 | Ciotola | | |
| 4,876,158 A * | 10/1989 | Onuki et al. | ................. | 277/444 |
| 4,934,350 A * | 6/1990 | Lassanske | ................ | 123/193.6 |
| 5,029,562 A | 7/1991 | Kamo | | |
| 5,037,115 A | 8/1991 | Brandon | | |
| 5,169,162 A * | 12/1992 | Azaml et al. | ................. | 277/465 |
| 5,275,422 A * | 1/1994 | Rehfeld | ....................... | 277/468 |
| 5,380,018 A * | 1/1995 | Mader et al. | ................ | 277/467 |
| 5,611,306 A * | 3/1997 | Takano | .................... | 123/188.3 |
| 5,664,536 A * | 9/1997 | Bigsby | ..................... | 123/193.4 |
| 5,676,380 A * | 10/1997 | Sell | ............................. | 277/465 |
| 5,779,244 A * | 7/1998 | Moriarty et al. | ............. | 277/311 |

(Continued)

*Primary Examiner*—Alison K Pickard
(74) *Attorney, Agent, or Firm*—Oral Caglar, Esq.

(57) ABSTRACT

A piston ring for use at temperatures above 350° F. at pressures greater than or equal to about 2000 psi, comprising a gap having a gap width about 1.4 to about 2.0 times greater than a thickness of the piston ring; a height about 4.5 to about 6.4 times larger than the thickness, and a leading edge characterized by an arc having a radius of curvature of less than or equal to about 4 times the height. The piston ring may be formed of a material comprising cobalt, chromium, tungsten, and carbon. A gas compressor and method of sealing a piston using the above piston ring is also provided for.

43 Claims, 2 Drawing Sheets

U.S. PATENT DOCUMENTS

| | | | | |
|---|---|---|---|---|
| 5,865,443 A * | 2/1999 | Abe | .......................... | 277/448 |
| 6,428,014 B2 | 8/2002 | Scarlett | | |
| 6,527,879 B2 | 3/2003 | Kubota et al. | | |
| 6,536,385 B1 | 3/2003 | Takashima | | |
| 6,715,767 B1 * | 4/2004 | Meernik et al. | ............. | 277/459 |
| 6,938,879 B2 * | 9/2005 | Bancroft et al. | ............. | 251/306 |
| 7,010,844 B2 * | 3/2006 | Pekarsky et al. | ............. | 29/451 |
| 2002/0168285 A1 * | 11/2002 | Blake et al. | ................ | 420/585 |
| 2004/0217550 A1 * | 11/2004 | Lee | ........................... | 277/459 |
| 2005/0006006 A1 * | 1/2005 | Schall | ...................... | 148/225 |
| 2005/0109289 A1 * | 5/2005 | Usui et al. | ................... | 123/19 |

* cited by examiner

US 7,510,195 B2

HIGH TEMPERATURE AND HIGH PRESSURE COMPRESSOR PISTON RING

GOVERNMENT RIGHTS

This invention was made with Government support under Contract Number F33657-91-C-0006 awarded by Boeing Military Aircraft. The United States Government may have certain rights in this invention.

BACKGROUND OF THE INVENTION

The present invention generally relates to apparatus and method for compressing a fluid (e.g., a gas such as air) at high temperature (i.e., greater than or equal to about 350° F.) and high pressure (i.e., greater than or equal to about 2000 pounds per square inch). More specifically, the present invention relates to apparatus and methods relating to piston rings for use in compressors operated to produce high pressure fluids at high temperatures.

Air compressors used to produce high pressures in excess of 2000 psi, which may exceed 5000 psi, at high temperatures in excess of 350° F. may be utilized in, for example air-recharge systems on an aircraft. Air-recharge systems may be used to provide emergency power to the aircraft. Accordingly, air compressors used in these systems may need to be reliable, and may need to have a relatively long operational life time in excess of 10 years of service. However, the extreme temperatures and pressures of such service may not be conducive to such long operational lifetimes.

The basic operational principle of such fluid reciprocating pumps or air compressors is to draw fluid into a cylinder through a one-way valve by linear movement of a piston sliding in sealed relationship within the cylinder and then to expel the fluid from the cylinder through a further one-way valve by reversing the direction of movement of the piston within the cylinder. The cylinder may be defined by a cylinder wall, the piston being reciprocally mounted within the cylinder, a crankshaft being coupled to the piston, and arranged such that rotational movement of crankshaft causes reciprocating axial movement of the piston within the cylinder. The piston disposed in the cylinder may thus define an annular cavity between the piston and the cylinder wall.

A compressor useful to compress a fluid (e.g., a gas such as air) to pressures in excess of 2000 psi at temperatures in excess of 350° F. may comprise a plurality of cylinders. The cylinders may be arranged in serial communication, with the first in the series receiving the lowest pressure intake (e.g., atmospheric pressure), and exhausting to the intake of another cylinder in the series. Accordingly, each cylinder may increase the pressure and the temperature of the fluid until the final stage wherein the high pressure, high temperature fluid is discharged from the compressor, for example into a storage vessel.

Because the diameters of the piston and the receiving cylinder bore differ, a sealing arrangement is needed. One approach to sealing the annular cavity at the piston/cylinder interface is to size the piston to be fit in the cylinder such that the cavity is sealed with a film of lubricant such as an oil film. This approach may use oil from a sump, which enters the cylinder on the side of the piston away from the fluid being pumped or compressed. Generally, an oil scraper is provided to recirculate oil spread up the wall of the cylinder back to the sump via the interior of the piston. However, sealing at temperatures above 350° F. and pressures in excess of 2000 psi may become difficult due to thermal expansions of the cylinder wall and piston, along with viscosity breakdown of the lubricating oil.

An approach to sealing the piston/cylinder interface that does not rely on an oil film is to provide the piston with one or more circumferential grooves within an upper end of the piston. Piston rings are installed in these grooves, which rings have a slightly larger outer diameter than the piston. The piston rings generally bear directly against the cylinder wall and create a seal between the sides of the piston ring groove and the cylinder wall. The ends of the piston ring may be tapered and/or fitted to interlock, such that when the piston ring is installed on a piston which is sealingly fit within a cylinder, essentially no gap is present between the piston ring ends.

The degree to which the piston ring and the cylinder wall of a compressor contact one another can vary significantly due to disparate thermal expansions, thermal deformations, inlet and outlet pressures, and the like. Such forces may have a limiting effect on the usefulness of a piston ring and/or a cylinder. Under temperatures in excess of about 350° F. and final pressures over about 2000 psi, especially in the absence of external lubrication, a piston ring may wear to a point such that the compressor is unable to achieve a high pressure. Such high pressure and high temperature may also cause the cylinder walls to become scored, thus limiting the usefulness of the compressor. Accordingly, compressors operated to deliver relatively high outlet pressures (e.g., pressures in excess of 2000 psi) at relatively high temperatures (e.g., temperatures exceeding about 350° F.), may demonstrate piston rings that wear quickly, or cylinder bores which become scored by, for example, dry running of piston rings (i.e., without an external lubricant) therein. Thus, operation of compressors at relatively high outlet pressures and at relatively high temperatures may substantially limit the useful lifetime of a piston ring, and/or of the compressor itself.

As can be seen, there is a need for a piston ring that will prevent premature wear, and/or scoring of the cylinder bore, and which can provide for compression of a fluid over 2000 psi at temperatures greater than or equal to about 350° F.

SUMMARY OF THE INVENTION

In one aspect of the present invention a piston ring comprises: a top surface separated from a bottom surface by a height; an inside surface connecting the top surface to the bottom surface; an outside surface connecting the top surface to the bottom surface; the inside surface being separated from the outside surface by a thickness; a gap extending completely through the ring from the top surface to the bottom surface and from the outside surface to the inside surface when the piston ring is on a piston; the gap characterized by a gap width that is about 1.4 to about 2.0 times greater than the thickness.

In another aspect of the invention, a piston ring comprises: a top surface separated from a bottom surface by a height; an inside surface connecting the top surface to the bottom surface; an outside surface connecting the top surface to the bottom surface; the inside surface being separated from the outside surface by a thickness, wherein the height is about 4.5 to about 6.4 times larger than the thickness; a gap extending completely through the ring from the top surface to the bottom surface and from the outside surface to the inside surface when the ring is installed on a piston; and the piston ring having a ductility to allow the piston ring to be positioned on the piston without the piston ring becoming cracked, fractured, or bent into a second shape different from a first shape which characterized the piston ring prior to being positioned on the piston.

In still another aspect of the present invention, a gas compressor apparatus comprises: a cylinder; a piston reciprocally mounted within the cylinder; a piston ring positioned about the piston, the piston ring having: a gap that is characterized by a gap width that is about 1.4 to about 2.0 times greater than a thickness of the piston ring when the piston ring is installed on the piston; and wherein a height of the piston ring is about 4.5 to about 6.4 times larger than the thickness.

In a still further aspect of the present invention, a gas compressor apparatus comprises: a cylinder; a piston reciprocally mounted within the cylinder; a piston ring positioned about the piston, the piston ring comprising a top surface connected to an outside surface though a leading edge, the leading edge characterized by an arc having a radius of curvature of less than or equal to about 4 times the height; and wherein the piston ring is formed of a material comprising about 64 wt % to about 68 wt % cobalt, about 26 wt % to about 30 wt % chromium, about 3.5 wt % to about 5.5 wt % tungsten, and about 0.5 wt % to about 2 wt % carbon.

In yet another aspect of the present invention, a method of sealing a piston at a temperature up to about 450° F. at a pressure up to about 5000 psi, comprises: positioning a piston ring about a piston, mounting the piston within a cylinder such that the piston ring is sealingly engaged with a wall of the cylinder; the piston ring having: a gap that is characterized by a gap width that is about 1.4 to about 2.0 times greater than a thickness of the piston ring when the piston ring is installed on the piston; a height that is about 4.5 to about 6.4 times larger than the thickness; a top surface connected to an outside surface through a leading edge, the leading edge characterized by an arc having a radius of curvature of less than or equal to about 4 times the height; and the piston ring is formed of a material comprising about 64 wt % to about 68 wt % cobalt, about 26 wt % to about 30 wt % chromium, about 3.5 wt % to about 5.5 wt % tungsten, and about 0.5 wt % to about 2 wt % carbon.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Broadly, the present invention generally provides a piston ring for use at temperatures above about 350° F., and pressures above about 2000 psi. In an embodiment, the piston ring of the present invention may have a gap between its distal ends that is about 1.4 to about 2.0 times greater than a thickness of the ring when the piston ring is installed on a piston.

This is in contrast to the prior art wherein the piston rings may be dimensioned such that no gap is present between distal ends of the installed piston ring, such as when the distal ends of the piston ring actually overlap through a tapered or other arrangement when the ring is installed on a piston. Also, the piston ring of the present invention may have a height that is about 4.5 to about 6.4 times larger than its thickness. This too is in contrast to the prior art, wherein the thickness of the piston ring may be in excess of the height. Further, the present piston ring may have a leading edge characterized by an arc having a radius of curvature of less than or equal to about 4 times the height. The piston ring thus may have a sharp transition between the outside surface and the top surface. This too is in contrast to the prior art, wherein the leading edge of the piston ring may not be well defined, or wherein the outer surface of the piston ring defines an arc from the bottom surface to the top surface of the piston ring. Still further, the present piston ring may have a ductility to allow the piston ring to be installed (e.g., positioned on a piston) without the piston ring becoming cracked, fractured, or bent into a second shape that is different from a first shape, which characterized the piston ring prior to it being positioned on the piston. This also is in contrast to the prior art, wherein rings lacking ductility retain stress caused by ring installation (residual stress), which may contribute to piston ring failure.

Figure 1:
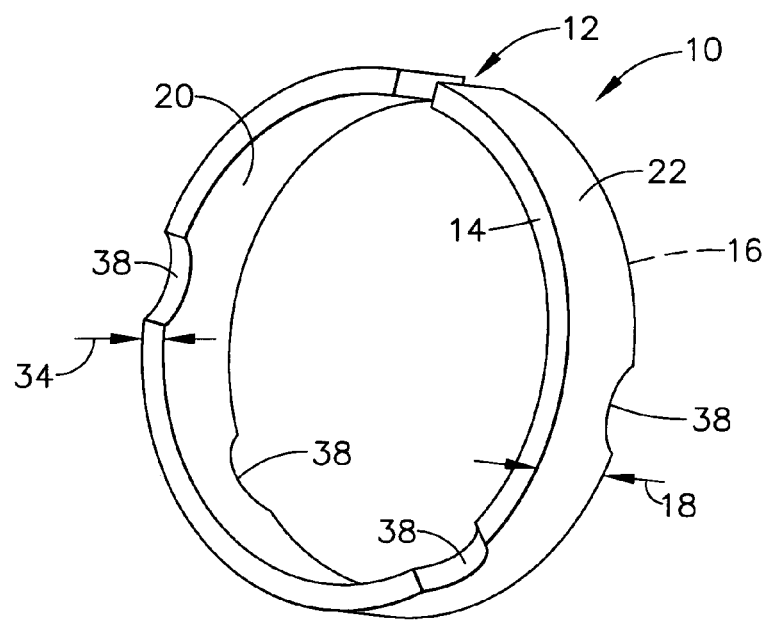
FIG. 1 is a partial, perspective view of a piston ring according to an embodiment of the present invention.

In more specifically describing the present invention, FIG. 1 shows a perspective representation of an embodiment of a piston ring 10 for use in a compressor (not shown) as described herein. The piston ring 10 can be essentially circular in shape except for a discontinuous section that may form a gap 12 in the ring 10. The piston ring 10 may comprise a top surface 14 separated from a bottom surface 16 by a height 18, an inside surface 20 connecting the top surface 14 to the bottom surface 16, an outside surface 22 connecting the top surface 14 to the bottom surface 16, and the inside surface 20 separated from the outside surface 22 by a thickness 34. In one embodiment, the top surface 14 and the bottom surface 16 may be essentially parallel planar surfaces. Likewise, the inside surface 20 and the outside surface 22 may be essentially parallel planar surfaces.

The gap 12 may extend completely through the ring 10 from the top surface 14 to the bottom surface 16, and from the outside surface 22 to the inside surface 20, thereby defining a gap width 36. The gap width 36 may be characterized when the piston ring 10 is installed on a piston, and also when the piston is positioned within a cylinder (not shown).

Figure 2:
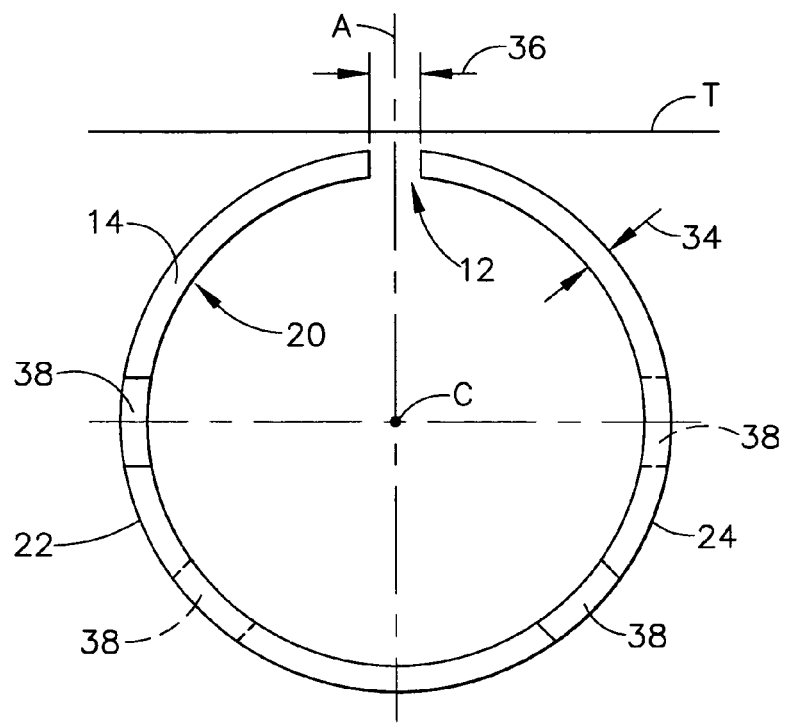
FIG. 2 is a top, plan view of the piston ring shown in FIG. 1.

FIG. 2 shows a top plan view of the piston ring 10 shown in FIG. 1. Referring to FIG. 2, the gap 12 may form a straight cut through the ring, extending radially along, and parallel to an imaginary line A through a center point C of the piston ring 10 (i.e., the center point C is disposed equidistant from inside surface 20). Accordingly, line A, which bisects piston ring 10, can be in the center of gap 12. Gap 12 thus can be disposed perpendicular to a line T, disposed tangent to a point on the outside surface 22. In an embodiment, the gap width 36 may be about 1.4 to about 2.0 times larger than a thickness 34 of the ring 10, when the piston ring 10 is installed on a piston, and is sealingly fit (i.e., disposed in sealing contact) with a cylinder wall (not shown). In an exemplary embodiment, the gap width 36 can be from about 0.01 to about 0.02 inches when the piston ring 10 is installed on a piston.

In an embodiment, the piston ring 10 may be further characterized by a height 18 that can be greater than the thickness 34. As an example, the ratio of the height 18 to the thickness 34 can be about 4.5 to about 6.4.

Figure 3:
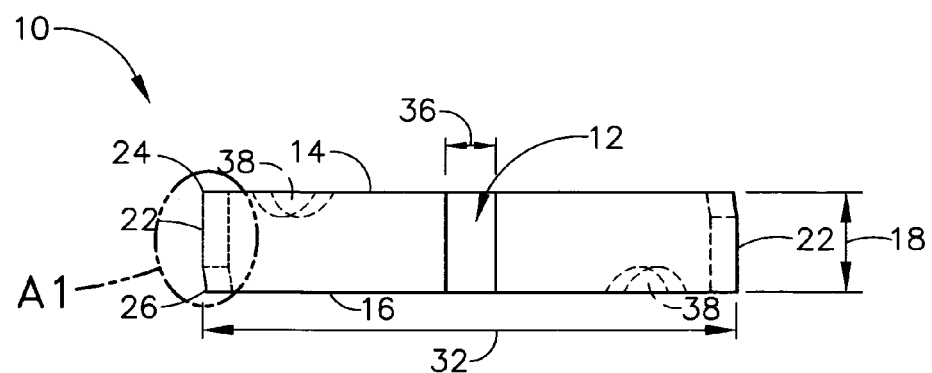
FIG. 3 is a side view of the piston ring shown in FIG. 1.
Figure 4:
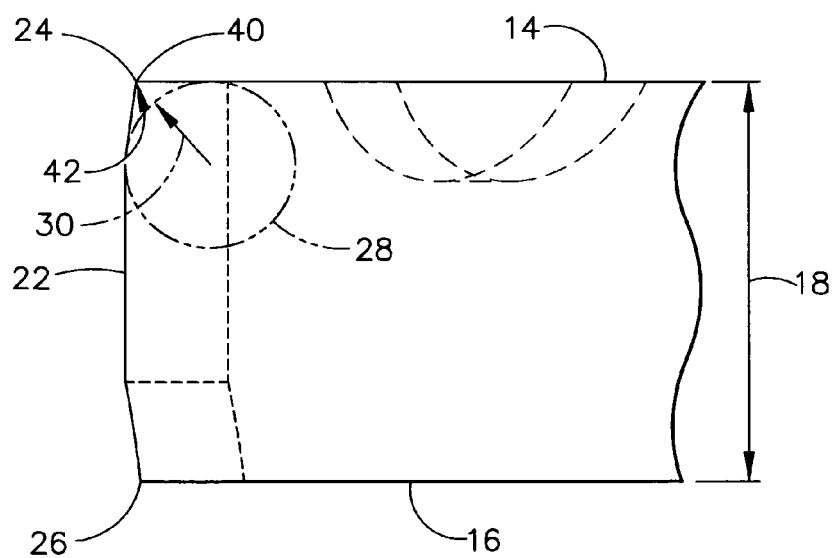
FIG. 4 is a partial detail of the portion A of the piston ring shown in FIG. 3.

Referring now to FIGS. 3 and 4, which depict a side view and an enlarged detail respectively of the piston ring 10 shown in FIGS. 1 and 2, the top surface 14 can be disposed essentially perpendicular to the outside surface 22. The intersection of the top surface 14 and the outside surface 22 can form a leading edge 24. In the same way, the intersection of the bottom surface 16 and the outside surface 22 may form a trailing edge 26.

The leading edge 24 may be characterized by a single point 40, or a locust of points in the shape of an arc 42, which can define a transition from the top surface 14 to the outside surface 22. The curvature of arc 42 that characterizes the leading edge 24 can thus be represented in terms of a circle 28 having the same radius 30 as does the arc 42. In an embodiment, the leading edge 42 is sharp (i.e., the leading edge approximates a single point 40). Accordingly, a measure of the sharpness (i.e., lack of curvature) of the leading edge 24 may be determined in terms of the radius 30 of the arc 42 which characterizes the leading edge 24. As shown in FIG. 4, the radius 30 of the circle 28, a portion of which characterizes the leading edge 24, is referred to herein as the arc's radius of curvature, which is represented by the radius arrow 30.

In one embodiment, the radius of curvature 30 can be less than or equal to about 0.002 inches, with less than or equal to about 0.001 inches preferred in another embodiment, and less than or equal to about 0.0005 inches preferred in still another embodiment.

In an embodiment, the top surface 14, and/or the bottom surface 16 of the piston ring 10 can have a relatively smooth finish to allow for contact between the sealing surfaces of the piston (not shown), the piston ring 10, and the cylinder wall (not shown). Accordingly, in an embodiment, the top surface 14, the bottom surface 16, or both, may be finished so as to have a surface with a roughness less than or equal to about 16 microinches, as determined using the root mean square of the average roughness. In another embodiment, the top surface 14, the bottom surface 16, or both surfaces can have a roughness of less than or equal to about 10 microinches. In still another embodiment, the top surface 14, the bottom surface 16, or both, may be finished so as to have a roughness of less than or equal to about 8 microinches root mean square roughness.

The piston ring 10 may also comprise one or more grooves or recesses 38 formed into the top surface 14, the bottom surface 16, and/or the inside surface 20, and/or the outside surface 22. The recesses 38 may be used to relieve a portion of the pressure exerted on the piston ring 10 while the piston ring is being operated within a compressor (not shown). Accordingly, the recesses 38 may equalize the pressures exerted on the leading edge 24 (FIG. 3) and the trailing edge 26 (FIG. 3) of the piston ring 10.

As shown in FIG. 1, the recesses 38 may be disposed in a portion of three of the four surfaces (e.g., a combination of the inside surface 20, the top surface 14, and the outside surface 22, or a combination of the inside surface 20, the bottom surface 16, and the outside surface 22). Accordingly, the recesses 38 may not extend completely through the piston ring 10, but may merely extend partially into three of the four surface of the piston ring 10. In one embodiment, a plurality of the recesses 38 can be substantially equally spaced about a circumference of the piston ring 10.

In one embodiment, the piston ring 10 can be formed from a material capable of providing sealing engagement between a piston and a cylinder wall (not shown) at temperatures up to and including 450° F. In another embodiment, the piston ring 10 can be formed from a material capable of providing sealing engagement between a piston and a cylinder wall (not shown) at pressures up to and including about 5000 psi. The material of the piston ring 10 may also be flexible enough such that upon installation of the piston ring 10 onto a piston (not shown), the piston ring 10 is not deformed so as to compromise the fit of the piston ring 10 in an annular recess disposed in a periphery of the piston (not shown) of which the piston ring 10 is installed (not shown). Accordingly, in an embodiment, the piston ring 10 may have a ductility which allows the piston ring 10 to be positioned on a piston without the piston ring 10 becoming cracked, fractured, or bent out of shape (i.e., bent into a second shape different from a first shape which characterized the piston ring prior to being positioned on the piston).

Since a cobalt based alloy may be a brittle material, the life endurance of the piston ring 10 may be a function of wear and fatigue life. Fatigue life may be a function of the stress placed on or present within the piston ring. Accordingly, as wear of the piston ring 10 increases, the piston ring 10 may become deformed from an original shape. This deformation may thus increase or cause additional internal stress within the piston ring 10, for example due to additional bending moment. Therefore, the ring thickness 34 may be important to the lifetime of the piston ring. However, an excessive thickness 34 of a piston ring may cause the piston ring 10 to be damaged during the stretching which may be required for installation onto the piston (not shown). Also, an overly thin or reduced thickness 34 of the piston ring 10 may result in a reduced wear life.

In one embodiment, the piston ring 10 disclosed herein can be formed from a material comprising cobalt, chromium, tungsten, and carbon. This material may be, in one embodiment, a metal alloy comprising about 64 to about 68 wt % cobalt (Co). In one embodiment 66 wt % Co is preferred. The material may also comprise about 26 to about 30 wt % chromium (Cr), with about 28 wt % Cr being preferred in one embodiment. Further, the material may comprise about 3.5 to about 5.5 wt % tungsten (W), with about 4.5 wt % W being preferred in an embodiment. The material may also comprise about 0.5 to about 2 wt % carbon (C), with about 1 wt % C being preferred in an embodiment. The material may also comprise silicon, manganese, and/or molybdenum. In one embodiment, silicon (Si) is present in the material at about 1 to about 3 wt %, with 2 wt % Si being preferred; manganese (Mn) may be present at about 0.5 to about 1.5 wt %, with 1 wt % Mn being preferred; and molybdenum (Mo) may be present at about 1 to about 2 wt %, with 1.5 wt % Mo being preferred. The material may also comprise less than or equal to about 3 wt % Ni, and/or less than or equal to about 3 wt % Fe.

In an alternative embodiment, a material for use herein may comprise about 64 to about 68 wt % Co; about 26 to about 30 wt % Cr; about 3.5 to about 5.5 wt % W, and about 0.5 to about 2 wt % C.

In another embodiment, the material may comprise about 64 to about 68 wt % Co; about 26 to about 30 wt % Cr; about 3.5 to about 5.5 wt % W; about 0.5 to about 2 wt % C, about 1 to about 3 wt % Si, about 0.5 to about 1.5 wt % Mn, about 1 to about 2 wt % Mo, and/or less than or equal to about 3 wt % Ni, and/or less than or equal to about 3 wt % Fe.

Yet in another embodiment, the material may comprise about 66.3 wt % Co; about 28 wt % Cr; about 4.5 wt % W; about 1.2 wt % C, about 2 wt % Si, about 1 wt % Mn, about 1.5 wt % Mo, less than or equal to about 3 wt % Ni, and less than or equal to about 3 wt % Fe. A preferred material for use herein is commercially available under the trade name Stellite 6B® from Deloro Stellite Canada, Inc.

The piston ring may have a constant hardness maintained throughout the number of thermal cycles also known as the recovery hardness in a range which minimizes wear of the piston ring itself due to friction and other forces experienced during operation, but which also prevents wear of the cylinder wall by the piston ring. In an embodiment, the Rockwell C hardness scale may be used, wherein a lower Rockwell C value indicates a softer material relative to a material having a higher Rockwell C value. Materials suitable for use herein as the piston ring 10 may have a Rockwell C hardness of greater than or equal to about 37, and less than or equal to about 43 preferred in an embodiment. Within this range, a Rockwell C hardness of less than or equal to about 42 can be employed, with less than or equal to about 41 preferred in an embodiment. Also preferred within this range is a Rockwell C hardness of greater than or equal to about 38, with greater than or equal to about 39 more preferred in another embodiment, and greater than or equal to about 40 especially preferred in another embodiment.

In one embodiment, the material from which the piston ring 10 is formed may inherently comprise a Rockwell C hardness of about 37 to about 43 such that heat treatment may not be required after machining of the material into piston ring 10. In one embodiment, the material may be heat treated to a Rockwell C hardness of about 37 to about 43 prior to being machined, and/or otherwise formed into the piston ring described herein. In still another embodiment, the piston ring 10, once formed, may be heat-treated to achieve a Rockwell C hardness of about 37 to about 43.

It has also been discovered that even though the hardness of the cylinder (not shown) may be less than the hardness of piston ring 10, which may be thought to induce wearing of the cylinder, the presently claimed invention may be used in such an apparatus either with, or without the addition of an external lubricant (not shown). The method of employing external lubrication, such as using an oil sump or an oil mist in the inlet of a pump (not shown) were not found necessary to effectively utilize piston ring 10.

In an embodiment, a plurality of piston rings on a single piston may be utilized. In one embodiment, up to about 10 piston rings may be used on a single piston.

EXAMPLES

A four stage compressor was utilized in the following examples. The first through third stages produced compressed air at about 1750 psig. The fourth stage compressed the air to an outlet pressure of about 5000 psig. The temperature of the compressor ranged from ambient to about 500° F. during the course of the tests. Each cycle was 18 minutes long. After each cycle, the pressure storage vessel was vented and the testing reset to ambient conditions prior to beginning the next test.

The tests were conducted both with external lubrication, in the form of an oil mist in the inlet of the compressor, and dry, without lubrication. The moisture content in the air was also varied from essentially zero, up to about 48 grains of water per pound of air (i.e., a dew point of 0.5° F.). The compressor was operated at between about 5100 RPM and 5300 RPM, consistent with the apparatus used. In each case, one RPM equates to one compression cycle for each of the pistons.

Examples 1 and 2 each utilized a Co alloy comprising 66.3 wt % Co; 28 wt % Cr; 4.5 wt % W; and 1.2 wt % C.

The data are summarized in Table 1 below.

TABLE 1

| Test Number | Lube Oil mL/ 10 min | Grains water per pound air | Piston Ring Material | Piston Ring Gap (inches) | Top and Bottom surface Finish (micro inches) | Ring Thickness | # Cycles | #1 Ring Location (counting from piston tip) Avg. Wear (inches) | #2 Ring Location (counting from piston tip) Average Wear (inches) |
|---|---|---|---|---|---|---|---|---|---|
| Example 1 | 1 | 6.5 | Co Alloy* | 0.015 | 6–8 | .0125 | 100 | Wear surface @ 180° from gap but not measurable (85% tool marks visible) | none |
| Example 2 | 1 | 6.56 | Co Alloy* | 0.015 | 6–8 | .0085 | 600 | None | none |
| Comparative Example 3 | 1 | 8.66 | Tool Steel w/Chrome Plate | 0.015 | 6–8 | .0085 | 100 | 0.00072 | 0.00084 |
| Comparative Example 4 | 1 | 6.56 | Tool Steel w/Chrome Plate | 0.020 | 6–8 | .0085 | 100 | 0.00052 | 0.0004 |
| Comparative Example 5 | 1 | 6.56 | Carbon AXF.5Q | 0.035 | 6–8 | .0125 | 100 | 0.00268 | Ring gone |

*Made from Stellite-6B

The average wear of the first and second piston ring, coupled with the number of cycles, is an indication of the projected useful lifecycles of the piston ring. As the data shows, the Examples (1 and 2) provided superior wear characteristics (e.g., no detectable wear) then did the comparative piston rings (Comparative Examples 1-5) when tested under similar test conditions. In addition, test data also proved that thinner piston rings (0.0085") had less wear and last longer than comparable thicker piston rings (0.0125"). Accordingly, the projected useful lifecycles of the Examples is essentially infinite according to these test parameters, and thus far exceeds the projected lifecycles of the Comparative examples. This superior wear may thus translate into an improved lifetime expectancy of the components.

It should be understood, of course, that the foregoing relates to preferred embodiments of the invention and that modifications may be made without departing from the spirit and scope of the invention as set forth in the following claims.

We claim:

1. A piston ring comprising:
    a top surface separated from a bottom surface by a height;
    an inside surface connecting said top surface to said bottom surface;
    an outside surface connecting said top surface to said bottom surface;
    said inside surface being separated from said outside surface by a thickness;
    a gap extending completely through said ring from said top surface to said bottom surface and from said outside surface to said inside surface when said piston ring is on a piston;
    said gap characterized by a gap width that is about 1.4 to about 2.0 times greater than said thickness,
    wherein said piston ring is made of a material comprising about 64 wt % to about 68 wt % cobalt.

2. The piston ring of claim 1, wherein said piston ring is formed of said a material comprising cobalt, chromium, tungsten, and carbon.

3. The piston ring of claim 2, wherein said material comprises about 26 wt % to about 30 wt % chromium.

4. The piston ring of claim 3, wherein said material comprises about 3.5 wt % to about 5.5 wt % tungsten.

5. The piston ring of claim 4, wherein said material comprises about 0.5 wt % to about 2 wt % carbon.

6. The piston ring of claim 5, wherein said material further comprises silicon, manganese, molybdenum, or a combination thereof.

7. The piston ring of claim 6, wherein said material comprises up to about 3 wt % nickel, up to about 3 wt % iron, or a combination thereof.

8. The piston ring of claim 1, wherein:
    said top surface is disposed substantially perpendicular to said outside surface,
    said top surface is connected to said outside surface through a leading edge, and
    said leading edge is characterized by an arc having a radius of curvature less than or equal to about 4 times said height.

9. The piston ring of claim 8, wherein said radius of curvature is less than or equal to about 10 times said height.

10. The piston ring of claim 1, wherein said top surface is disposed substantially perpendicular to said outside surface,
    said top surface is connected to said outside surface through a leading edge, and
    said leading edge is characterized by an arc having a radius of curvature less than or equal to about 0.002 inches.

11. The piston ring of claim 10, wherein said radius of curvature is less than or equal to about 0.0005 inches.

12. The piston ring of claim 1, wherein said gap defines an opening having a gap width, wherein said gap extends radially along an imaginary line intersecting a center point of said piston ring, said center point being disposed equidistant from said inside surface.

13. The piston ring of claim 12, wherein said gap width is about 0.01 inches to about 0.02 inches.

14. The piston ring of claim 1, wherein said top surface, said bottom surface, or both, comprise a finish having a roughness of less than or equal to about 16 microinches.

15. The piston ring of claim 1, wherein said top surface, said bottom surface, or both, comprise a finish having a roughness of less than or equal to about 8 microinches.

16. The piston ring of claim 1, further comprising two recesses formed at unique locations in said top surface, said inside surface, and said outside surface.

17. The piston ring of claim 16, further comprising two recesses formed at unique locations in said bottom surface, said inside surface, and said outside surface.

18. The piston ring of claim 17, wherein each of said two recesses formed in both the bottom surface and the top surface are the same size half-moon-shaped recesses that are substantially equally spaced about a circumference of said piston ring in relation to the ring gap location.

19. The piston ring of claim 1, wherein said height is about 4.5 to about 6.4 times larger than said thickness.

20. The piston ring of claim 1, wherein said thickness is about 0.007 inches to about 0.01 inches.

21. The piston ring of claim 1 having a Rockwell C hardness of about 37 to about 43.

22. The piston ring of claim 1 having a ductility to allow said piston ring to be positioned within an annular recess in a periphery of said piston, without said piston ring becoming cracked, fractured, or bent into a second shape different from a first shape which characterized said piston ring prior to being positioned on said piston.

23. A piston ring comprising:
    a top surface separated from a bottom surface by a height;
    an inside surface connecting said top surface to said bottom surface;
    an outside surface connecting said top surface to said bottom surface;
    said inside surface being separated from said outside surface by a thickness, wherein said height is about 4.5 to about 6.4 times larger than said thickness;
    a gap extending completely through said ring from said top surface to said bottom surface and from said outside surface to said inside surface when said ring is installed on a piston; and
    said piston ring having a ductility to allow said piston ring to be positioned on said piston without said piston ring becoming cracked, fractured, or bent into a second shape different from a first shape which characterized said piston ring prior to being positioned on said piston, wherein
    said gap has a gap width about 1.4 to about 2.0 times greater than said thickness when said Diston ring is retained in an annular recess disposed in a periphery of a piston and said piston ring is in a sealing fit in a cylinder; and
    said piston ring comprises about 64 wt % to about 68 wt % cobalt and about 26 wt % to about 30 wt % chromium.

24. The piston ring of claim 23, wherein said gap extends radially along an imaginary line intersecting a center point of said piston ring, said center point being disposed equidistant from said inside surface.

25. The piston ring of claim 24, wherein said gap width is about 0.01 inches to about 0.02 inches.

26. The piston ring of claim 23, wherein said piston ring comprises cobalt, chromium, tungsten, and carbon.

27. The piston ring of claim 26, wherein said piston ring comprises about 64 wt % to about 68 wt % cobalt, about 26 wt % to about 30 wt % chromium, about 3.5 wt % to about 5.5 wt % tungsten, and about 0.5 wt % to about 2 wt % carbon.

28. The piston ring of claim 23, wherein:
said top surface is disposed substantially perpendicular to said outside surface,
said top surface is connected to said outside surface through a leading edge, and
said leading edge is characterized by an arc having a radius of curvature less than or equal to about 4 times said height.

29. The piston ring of claim 28, wherein said radius of curvature is less than or equal to about 10 times said height.

30. The piston ring of claim 23, wherein said top surface is disposed substantially perpendicular to said outside surface, wherein said top surface is connected to said outside surface through a leading edge, and wherein said leading edge is characterized by an arc having a radius of curvature less than or equal to about 0.002 inches.

31. The piston ring of claim 30, wherein said radius of curvature is less than or equal to about 0.0005 inches.

32. The piston ring of claim 23, wherein said top surface, said bottom surface, or both, comprise a finish having a roughness of less than or equal to about 16 microinches.

33. The piston ring of claim 23, wherein said top surface, said bottom surface, or both, comprise a finish having a roughness of less than or equal to about 8 microinches.

34. The piston ring of claim 23, further comprising two recesses formed at unique locations in said top surface, said inside surface, and said outside surface.

35. The piston ring of claim 34, further comprising two recesses formed at unique locations in said bottom surface, said inside surface, and said outside surface, these same size half-moon shaped recesses being equally spaced about a circumference of the piston ring in relation to the ring gap location.

36. The piston ring of claim 23, wherein said thickness is about 0.007 inches to about 0.01 inches.

37. The piston ring of claim 23 having a Rockwell C hardness of about 37 to about 43.

38. A gas compressor apparatus comprising:
a cylinder;
a piston reciprocally mounted within said cylinder;
a piston ring positioned about said piston, said piston ring having:
a gap that is characterized by a gap width that is about 1.4 to about 2.0 times greater than a thickness of said piston ring when said piston ring is installed on said piston; and
wherein a height of said piston ring is about 4.5 to about 6.4 times larger than said thickness,
wherein said piston ring is formed of a material comprising about 64 wt % to about 68 wt % cobalt.

39. A gas compressor apparatus comprising:
a cylinder;
a piston reciprocally mounted within said cylinder;
a piston ring positioned about said piston, said piston ring comprising a top surface connected to an outside surface through a leading edge, said leading edge characterized by an arc having a radius of curvature of less than or equal to about 4 times said height; and
wherein said piston ring is formed of a material comprising about 64 wt % to about 68 wt % cobalt, about 26 wt % to about 30 wt % chromium, about 3.5 wt % to about 5.5 wt % tungsten, and about 0.5 wt % to about 2 wt % carbon.

40. The gas compressor apparatus of claim 39, wherein said material further comprises silicon, manganese, molybdenum, or a combination thereof, and wherein said material comprises up to about 3 wt % nickel, up to about 3 wt % iron, or a combination thereof.

41. The gas compressor apparatus of claim 39, wherein said gas compressor apparatus is capable of operating at a temperature of up to about 450° F. with a compressor inlet at about atmospheric pressure, to produce a compressed gas having a pressure greater than or equal to about 5000 psi at a compressor outlet.

42. A method of sealing a piston at a temperature up to about 450° F. at a pressure up to about 5000 psi, comprising:
positioning a piston ring about a piston,
mounting said piston within a cylinder such that said piston ring is sealingly engaged with a wall of said cylinder;
said piston ring having:
a gap that is characterized by a gap width that is about 1.4 to about 2.0 times greater than a thickness of said piston ring when said piston ring is installed on said piston;
a height that is about 4.5 to about 6.4 times larger than said thickness;
a top surface connected to an outside surface through a leading edge,
said leading edge characterized by an arc having a radius of curvature of less than or equal to about 4 times said height; and
said piston ring is formed of a material comprising about 64 wt % to about 68 wt % cobalt, about 26 wt % to about 30 wt % chromium, about 3.5 wt % to about 5.5 wt % tungsten, and about 0.5 wt % to about 2 wt % carbon.

43. The method of claim 42, wherein said piston ring has a ductility to allow said piston ring to be installed on said piston, without said piston ring becoming cracked, fractured, or bent into a second shape different from a first shape which characterized said piston ring prior to being installed on said piston.

* * * * *